April 5, 1938.   F. Y. KITZMILLER   2,113,112
THREAD CLIPPING MACHINE
Filed Sept. 21, 1936   5 Sheets-Sheet 1
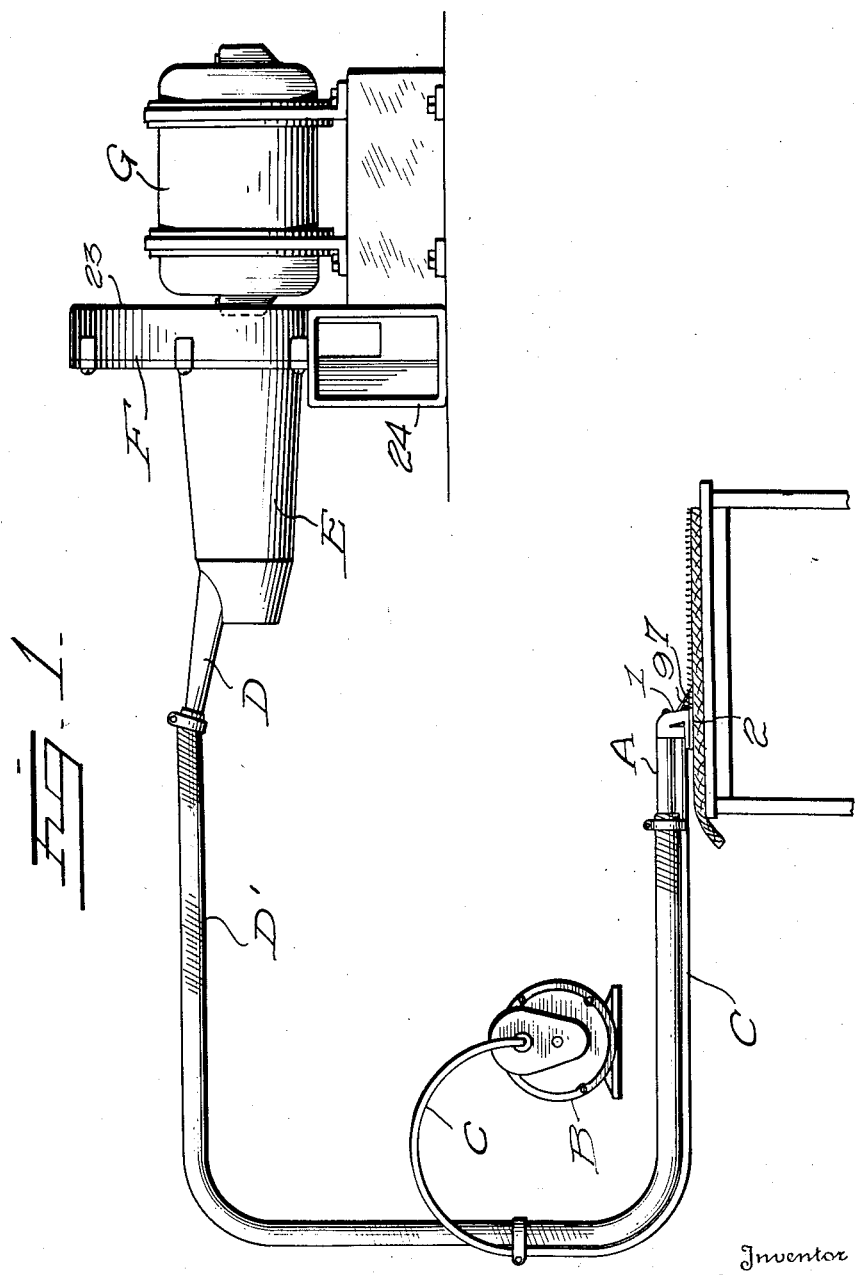

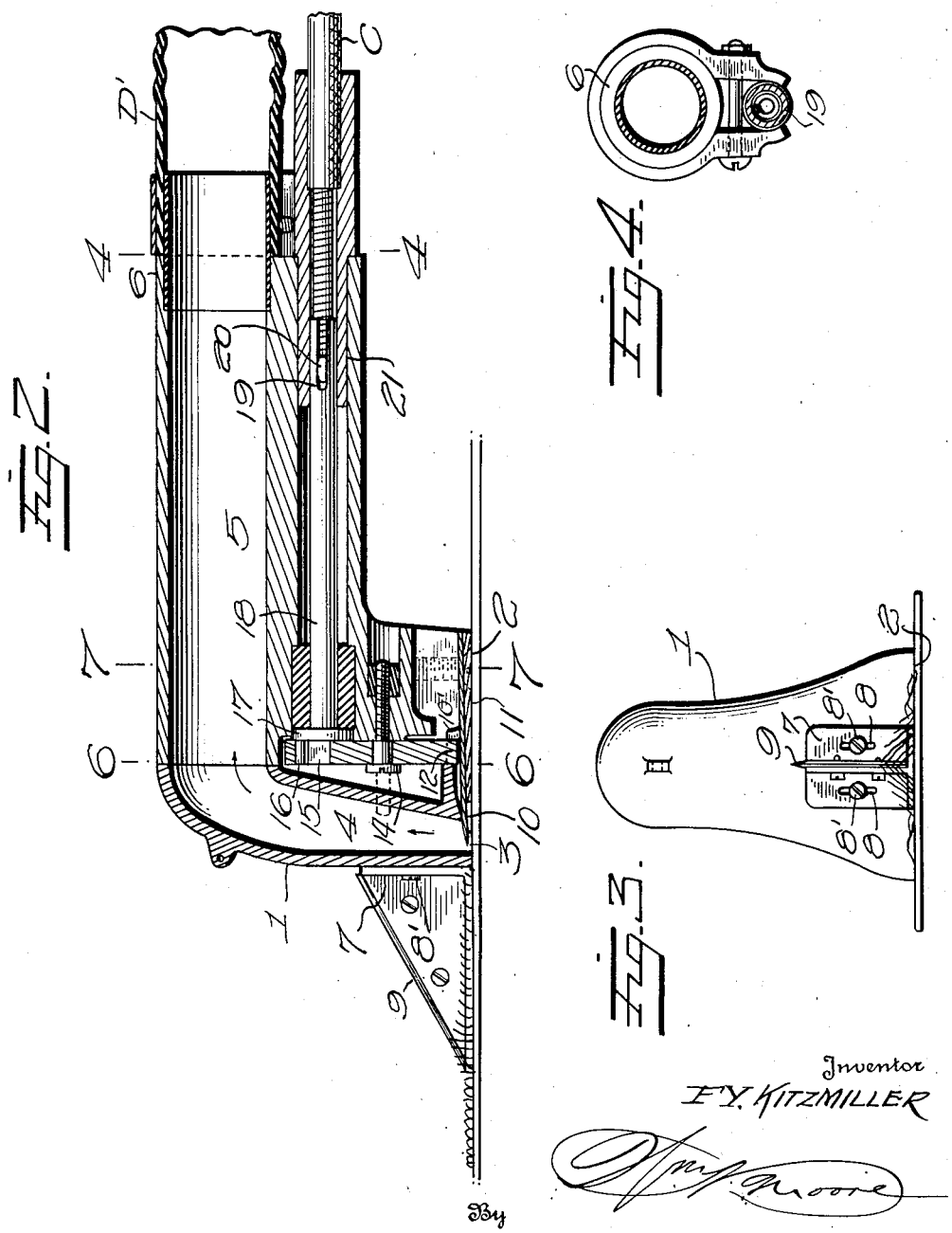

April 5, 1938.  F. Y. KITZMILLER  2,113,112
THREAD CLIPPING MACHINE
Filed Sept. 21, 1936  5 Sheets-Sheet 3

Inventor
F. Y. KITZMILLER
By
Attorney

April 5, 1938.   F. Y. KITZMILLER   2,113,112
THREAD CLIPPING MACHINE
Filed Sept. 21, 1936   5 Sheets-Sheet 5

Inventor
F. Y. KITZMILLER
By
Attorney

Patented Apr. 5, 1938

2,113,112

UNITED STATES PATENT OFFICE 2,113,112

THREAD CLIPPING MACHINE

Frank Y. Kitzmiller, Reading, Pa.

Application September 21, 1936, Serial No. 101,836

6 Claims. (Cl. 26—11)

My invention relates to improvements in thread clipping machines, and has particular and definite reference to a machine for clipping and removing the loose or floating threads from the inner surface of stockings to insure the production of a perfect product of this character.

In the manufacture of stockings when the work of the knitting machine has been completed the inner face or surface of the stocking has projecting therefrom loose or floating threads which at this time are removed or clipped with shears, such operation being time wasting, costly and resulting in damage to the stocking.

The main object of my invention is to overcome this most serious defect and objection and provide a machine which can be operated and controlled by any person of ordinary intelligence to remove the loose or floating threads in a rapid and perfect manner and finish the stocking in a perfect manner.

Another object of my invention is the provision of a clipping machine of the character and for the purpose stated which will be of small and compact size to occupy a small space area and which will have a very large work capacity.

Another object of my invention is the provision of a machine which will clip and discharge the threads and simultaneously carry the threads away from the machine to insure a clean and sanitary operation and mechanism.

Another object of my invention is the provision of a machine which while having a great capacity for work and making a complete and perfect finish of the stocking will be of simple, strong and durable construction to permit the manufacture of the machine at a price which will make its use practically imperative.

Another object of my invention is the provision of a machine of the character and for the purposes stated which while saving time, labor and expense in its operation will be thoroughly efficient and practical from every point of view.

With these objects in view my invention consists of a hand controlled and manipulated cutting or clipping element, means for operating said element, and means for removing and discharging the loose threads after the clipping operation.

The invention further consists of a machine of the character and for the purpose stated embodying novel features of construction and combination of parts, substantially as described and claimed and as shown in the accompanying drawings, in which:—

Figure 1 represents a side elevation of a thread clipping machine constructed in accordance with and embodying my invention.

Figure 2 represents a central longitudinal sectional view through the clipping member or element of my invention shown on an enlarged scale to show its detailed construction.

Figure 3 represents a front end view of the clipping element.

Figure 4 represents a sectional view taken on line 4—4 of Figure 2.

The machine as a whole or assembly when constructed in accordance with my invention consists of a hand or manually controlled and manipulated cutting element A, which is operated by the motor B, through the medium of the flexible shaft C; leading to the funnel D, is the pipe or tube D', which discharges into the drum E, connected with the fan or blower F, which is operated by means of the motor G, all as clearly shown in Figure 1.

Figure 5:
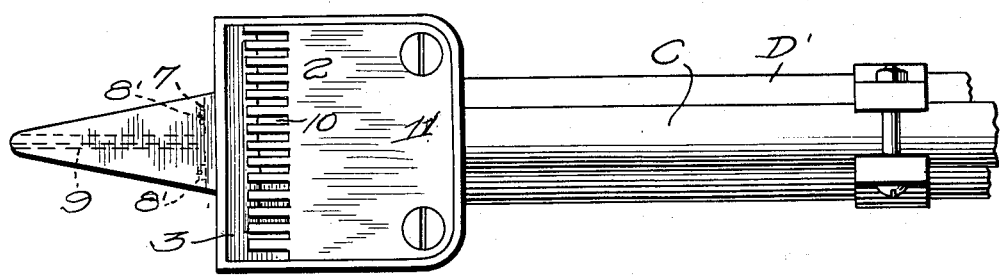
Figure 5 represents a bottom plan view of the clipping element.
Figures 6, 7:
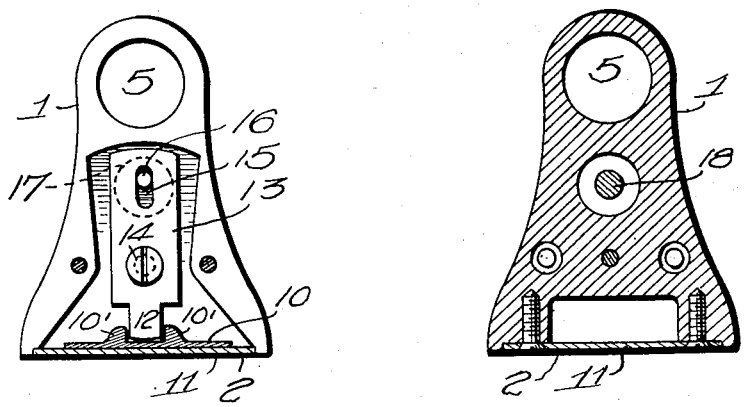
Figure 6 represents a sectional view on line 6—6 of Figure 2.
Figure 7 represents a sectional view taken on line 7—7 of Figure 2.
Figure 8:
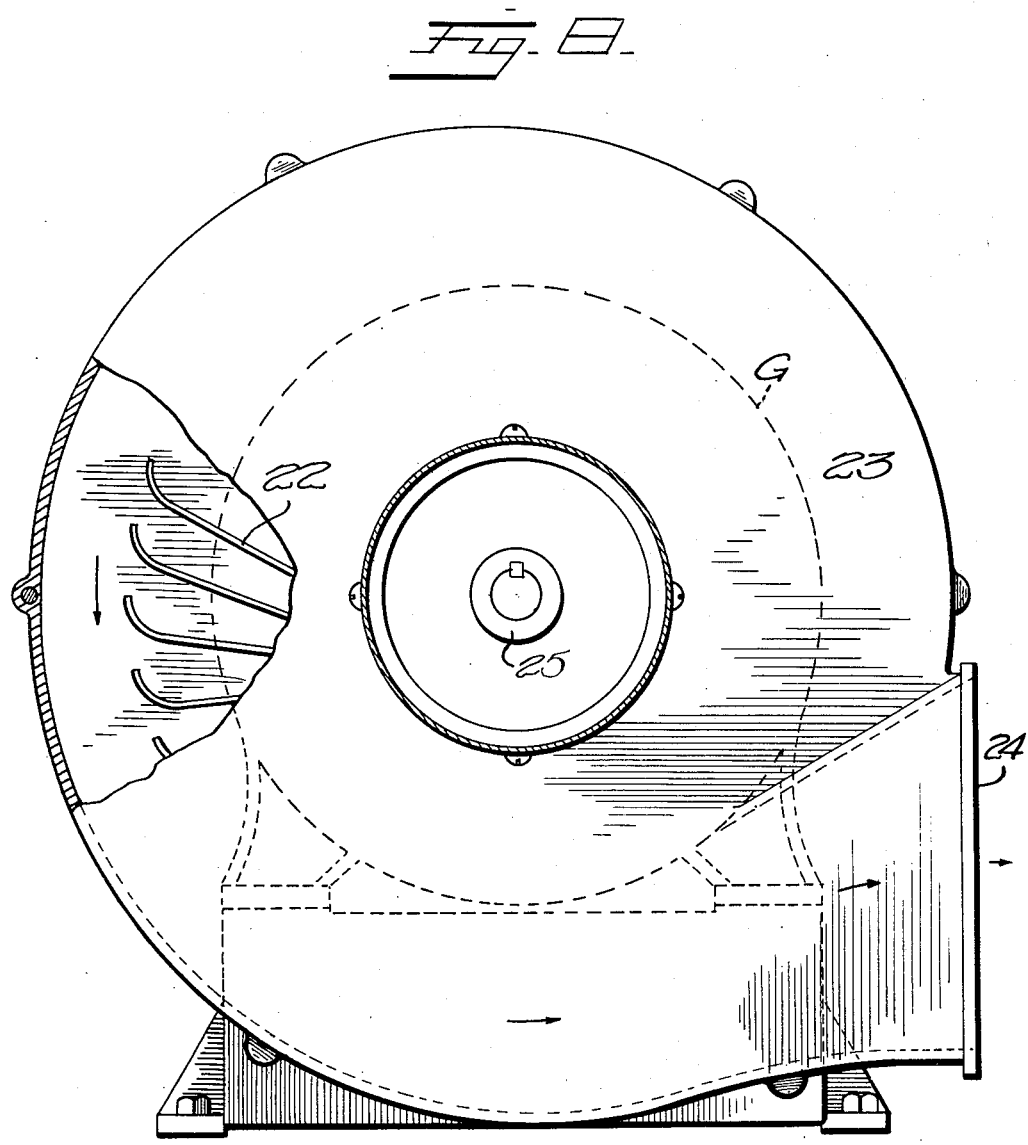
Figure 8 represents a view partly in section and partly in elevation with portions broken away to show details of construction.
Figure 9:
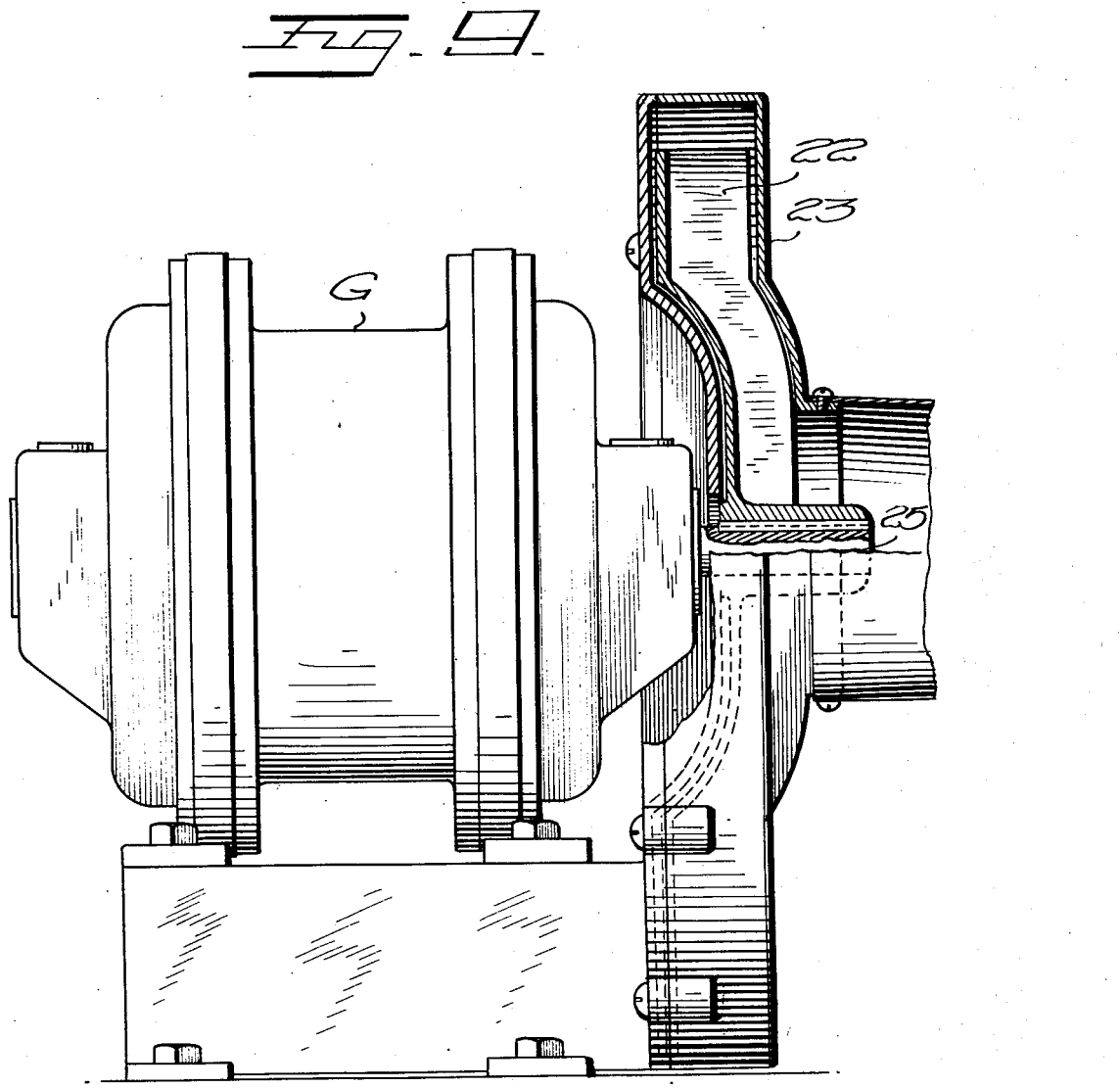
Figure 9 represents a view of the motor for driving the fan or blower with the blower in its relation to the motor, the motor being shown in elevation and the blower or fan in section.

The hand or manually controlled clipping element of my machine which is most clearly shown in Figures 1, 2, 3, 5, 6 and 7 is a most important and novel feature of my invention and consists of a casing or housing 1, having a flat bottom or face 2, to move over the stocking, an opening 3, in said flat bottom, a passage 4, leading upward from said opening and a horizontal tubular portion 5, in communication with the passage 4, and said tubular portion forms a handle or grasping portion for the element and at its end 6, is connected with the flexible tube D', associated with the fan or blower as will presently appear.

To the front end of said casing is secured the angle shaped plate 7, which is made vertically adjustable by means of the slots 8, and the screws 8', and secured to said plate is the inclined blade or knife 9, which as shown in Figure 2 passes under the loops or floating threads and severs them in advance of their being clipped by the cutting blade as will presently appear.

Suitably disposed with reference to the opening in the bottom of the casing and the reciprocating straight edged blade or cutter 10, is the guard 11, which co-acts with said blade in the clipping of the loose or floating threads of the stocking.

From this construction it will be understood that the stocking with the loose or floating threads is placed on a flat surface as a table and the advance knife of the casing lifts and severs the threads and these loose threads are then brought under the opening of the casing and are drawn in by the suction from the fan or blower and as soon as severed by the reciprocating cutter the suction draws the threads up and through the outlet of the casing and thence are discharged.

The blade or cutter 10, is provided with a pair of lugs 10', which receive the lower end 12, of the plate 13, pivoted at 14 to the casing, and the upper portion of said plate is formed with a slot 15, to receive the pin 16, which projects eccentrically from the disk 17, which is secured to the outer end of the rod 18, whose outer end is connected at 19, with the end 20, of the flexible shaft C, which shaft is rotatable in the tubular shaft mounting 21, formed with or secured to the horizontal tubular arm of the hand controlled clipping implement, and said tubular shaft mounting lies parallel with said tubular arm, all as most clearly shown in Figure 2.

The flexible shaft C, leads from the clipping element to the motor B, and is operated in any suitable manner, and the pipe or conduit D' leads to the funnel D, which discharges into the drum E, and from said drum E, the fan or blower blades 22, draw the air into the blower casing 23, and discharge the same through the spout 24, and the blower or fan is mounted on the shaft 25, of the motor and operated thereby, as will be readily understood.

The construction and arrangement of the blade or cutter 9, is of vital and paramount importance as this blade is disposed vertically and longitudinally and moves in advance of the thread cutters and acts to lift the looped threads and sever them so that they will be presented to the action of the reciprocating cutter to completely and smoothly sever the threads and make a clean smooth surface of the hose.

From the foregoing description taken in connection with the drawings the operation of my invention will be readily understood and the stocking with the loose or floating threads is placed on a flat surface and the flat face or bottom of the clipping element is placed upon the stocking, the fan or blower having been started and the flexible shaft receiving rotation from the motor, and the advance knife on the casing lifts and cuts the loose or floating threads and as the element moves along the threads are brought into the opening and drawn up by suction from the fan and the cutter being reciprocated cuts the threads and leaves a smooth surface on the stocking and at the same time the loose cut threads are carried away and discharged, thus making a perfect finish of the stocking, also assuring a clean sanitary service, and performing the work quickly and absolutely free of damage to the stocking, and proving a great saving in time, labor and money.

The many advantages of my machine will be readily understood and appreciated by all persons skilled in the industry and further comment is deemed unnecessary, and from my personal experience the machine of my invention is destined to fill a long felt want in a practical and efficient manner.

The machine is shown and described as a clipping machine for removing the loose or floating threads from stockings, but I would have it understood that I claim the right to use the machine for any purpose where it would perform its functions in an efficient and practical manner and any changes or modifications may be made in the construction of the machine which come within the scope of my invention as defined by the claims.

It will be apparent that in using my thread cutting machine the stocking must be held or retained on a flat surface with the looped or floating thread projecting above the flat surface of the stocking and in this condition the flat surface of the machine is passed over the flat supported stocking, the knife or blade thus first passes under and severs the looped or floating threads on the inner surface of the stocking thus raising and cutting said thread and in this condition they are subjected to the reciprocating transverse cutters which completely severs the loose threads close to the surface of the stocking, making a perfectly smooth surface without danger of cutting or in any manner injuring the stocking, which is the most important feature of this invention.

It will thus be evident that for the successful operation of my machine the stocking must be supported in flat smooth condition and the machine passes over the surface first lifting and cutting the looped or loose threads and finally completing the cutting operation by means of the reciprocating cutters.

I claim:

1. A machine of the character and for the purpose described, comprising a casing having a flat face, a rigid knife or blade having an inclined cutting edge for lifting and severing the looped threads and extending forward of the casing and having a lower flat surface to pass smoothly over the surface of the stocking, a cutting blade mounted for reciprocation in said casing, a throat in said casing to admit the threads to be cut, and means for operating the cutting blade.

2. A machine of the character and for the purpose stated, comprising a casing, a rigid knife or blade having an inclined cutting edge for lifting and severing the looped threads and extending forward of the casing and having a lower flat surface to pass smoothly over the surface of the stocking, a hand controlled and manipulated thread cutting element, a motor for operating the cutter of said element, and a vacuum or suction element operating in conjunction with said cutter to remove and discharge the threads after the cutting operation.

3. A machine of the character and for the purpose described, comprising a casing, a rigid knife or blade having an inclined cutting edge for lifting and severing the looped threads and extending forward of the casing and having a lower flat surface to pass smoothly over the surface of the stocking, a hand controlled cutting element, a cutting blade mounted in said element, a flexible shaft connection with said blade, a motor for rotating said shaft, operating connections between said shaft and cutter for moving said cutting blade.

4. A machine of the character and for the purpose described, comprising a hand controlled cutting element consisting of a casing having a throat to admit the threads to be severed, a rigid knife or blade having an inclined cutting edge for lifting and severing the looped threads and extending forward of the casing and having a lower flat surface to pass smoothly over the surface of the stocking, a cutting blade mounted in said casing in proper relation to the throat, a flexible shaft having operating connection with said blade, a motor for rotating said flexible shaft, a fan or blower associated with said casing and cutting blade to remove the severed threads, and a motor for operating said fan or blower.

5. A machine of the character and for the purpose described, comprising a hand controlled and manipulated cutting element, consisting of a casing having a horizontal grasping portion for manipulating the element, a flat lower face to pass over the stocking, an opening leading to a throat, an air outlet from the throat, a lifting and cutting blade secured to the front of the casing, a guard plate adjacent to the opening of the casing, a cutting blade co-acting with said guard plate, a rocking plate mounted in the casing, lugs on the cutting blade adapted to be engaged by the lower end of said plate to reciprocate said blade, a flexible shaft rotatable in the casing and having one end located to rock said plate, a motor connected with the other end of said flexible shaft to rotate said shaft, a pipe leading from the air passage or outlet of said casing, a fan or blower to which said pipe leads, and a motor for operating said fan or blower to produce suction to remove the cut threads.

6. A machine of the character and for the purpose described, comprising a casing having a flat lower face, a rigid knife or blade secured in advance to said casing and having an inclined cutting edge for lifting and severing the looped thread and having a lower flat surface to pass smoothly over the surface of the stocking, said casing having a transverse throat, a cutter mounted for reciprocation in said casing in proper relation to said throat, and means for operating said cutter.

FRANK Y. KITZMILLER.